United States Patent
Shimamura et al.

(10) Patent No.: US 9,834,884 B2
(45) Date of Patent: Dec. 5, 2017

(54) AQUEOUS DISPERSION OF POLYURETHANE RESIN, FLAME-RETARDANT POLYESTER FIBER USING THE SAME, AND METHOD FOR PRODUCING SAID FIBER

(71) Applicant: ADEKA CORPORATION, Tokyo (JP)

(72) Inventors: Nobuyuki Shimamura, Saitama (JP); Takashi Usui, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 170 days.

(21) Appl. No.: 14/429,855

(22) PCT Filed: Sep. 19, 2013

(86) PCT No.: PCT/JP2013/005527
§ 371 (c)(1),
(2) Date: Mar. 20, 2015

(87) PCT Pub. No.: WO2014/045577
PCT Pub. Date: Mar. 27, 2014

(65) Prior Publication Data
US 2015/0225893 A1    Aug. 13, 2015

(30) Foreign Application Priority Data

Sep. 21, 2012  (JP) ................. 2012-208386

(51) Int. Cl.

| | | |
|---|---|---|
| *D06M 15/572* | (2006.01) | |
| *C08K 5/523* | (2006.01) | |
| *D06M 13/292* | (2006.01) | |
| *D06M 15/564* | (2006.01) | |
| *C08G 18/66* | (2006.01) | |
| *C08G 18/75* | (2006.01) | |
| *C08G 18/08* | (2006.01) | |
| *C08G 18/12* | (2006.01) | |
| *C08G 18/40* | (2006.01) | |
| *C08G 18/44* | (2006.01) | |
| *C08G 18/00* | (2006.01) | |
| *C08G 18/48* | (2006.01) | |
| *C08G 18/10* | (2006.01) | |
| *C08G 18/42* | (2006.01) | |
| *D06M 101/32* | (2006.01) | |

(52) U.S. Cl.
CPC .......... *D06M 15/572* (2013.01); *C08G 18/00* (2013.01); *C08G 18/0823* (2013.01); *C08G 18/10* (2013.01); *C08G 18/12* (2013.01); *C08G 18/4018* (2013.01); *C08G 18/4213* (2013.01); *C08G 18/4216* (2013.01); *C08G 18/44* (2013.01); *C08G 18/4854* (2013.01); *C08G 18/6607* (2013.01); *C08G 18/6659* (2013.01); *C08G 18/755* (2013.01); *C08G 18/758* (2013.01); *C08K 5/523* (2013.01); *D06M 13/292* (2013.01); *D06M 15/564* (2013.01); *D06M 2101/32* (2013.01); *D06M 2200/30* (2013.01)

(58) Field of Classification Search
CPC .... C08K 5/523; D06M 5/572; D06M 13/292; C08G 18/0804; C08G 18/0838; C08G 18/0861; C08G 18/10; C08L 75/00; C08L 75/04; C08L 75/06; C08L 75/08
See application file for complete search history.

(56) References Cited

U.S. PATENT DOCUMENTS

| | | | | |
|---|---|---|---|---|
| 2003/0187112 A1* | 10/2003 | Kim | ....................... | C08K 5/523 524/127 |
| 2009/0214861 A1* | 8/2009 | Ogawa | .................... | C08L 51/04 428/339 |
| 2013/0203936 A1* | 8/2013 | Fujita | ....................... | C09D 5/02 524/591 |

FOREIGN PATENT DOCUMENTS

| | | |
|---|---|---|
| JP | H11-269766 A | 10/1999 |
| JP | 2000-017032 A | 1/2000 |
| JP | 2006-206835 A | 8/2006 |

(Continued)

OTHER PUBLICATIONS

English Machine translation for JP2006206835, dated Nov. 14, 2016.*

(Continued)

*Primary Examiner* — Christopher M Rodd
(74) *Attorney, Agent, or Firm* — Millen, White, Zelano, Branigan, P.C.

(57) ABSTRACT

An aqueous dispersion of polyurethane resin is obtained by a chain elongation reaction in water wherein (C) at least one chain extender selected from a group consisting of water-soluble polyamines, hydrazine and derivatives thereof is added to a dispersion liquid obtained by emulsifying and dispersing a mixture in water. The mixture comprises: (B) at least one compound selected from the phosphorous compounds represented by the following formula (1) and (A) an urethane prepolymer and/or a neutralized urethane prepolymer material which has an isocyanate group at the terminal. The urethane prepolymer of component (A) is an urethane prepolymer obtained from (a1) an organic polyisocyanate and (a2) a polymeric polyol. The neutralized urethane prepolymer material of component (A) is a neutralized material obtained by neutralizing an urethane prepolymer which is obtained by further using (a3) a compound having an anionic hydrophilic group and at least two active hydrogens in a molecule together with the components (a1) and (a2).

17 Claims, No Drawings

(56) References Cited

FOREIGN PATENT DOCUMENTS

| | | | |
|---|---|---|---|
| JP | 2006206835 A * | 8/2006 | |
| JP | 2012-072246 A | 4/2012 | |
| WO | WO 2012042732 A1 * | 4/2012 | ............... C09D 5/02 |

OTHER PUBLICATIONS

International Search Report from PCT/JP2013/005527 dated Dec. 10, 2013.
European Search Report dated Apr. 29, 2016, issued in corresponding EP 13 83 9372, 4 pages.
English translation Abstract of JPH11-269766 published Oct. 10, 1999 (1 page).

* cited by examiner

US 9,834,884 B2

AQUEOUS DISPERSION OF POLYURETHANE RESIN, FLAME-RETARDANT POLYESTER FIBER USING THE SAME, AND METHOD FOR PRODUCING SAID FIBER

TECHNICAL FIELD

The present invention relates to an aqueous dispersion of polyurethane resin, a flame-retardant polyester fiber using the same, and a method for producing said fiber. In more detail, the present invention relates to an aqueous dispersion of polyurethane resin suitable for a flame-retardant hard finish processing and a flame-retardant coating processing on a polyester fiber etc., a flame-retardant polyester fiber processed by said aqueous dispersion of polyurethane resin, and a method for producing the said fiber.

BACKGROUND ART

With respect to the polyester fibers and fabrics thereof used for fiber products such as a car seat, a roll screen and a filtering medium, for the purpose of the hard finish improving a strength or imparting a hard texture thereto, a resin processing has been commonly performed by using various polymeric compounds.

In addition, in order to impart a flame retardancy to these fiber materials, when the resin processing is performed, it is common that a flame retardant is used together with the resins for processing. However, depending on a flame-retardant level required and a flammability of fiber materials, a flame-retardant treatment is often performed before the resin processing. In this case, even though the fiber materials, which are a base material, become flame-retardant, the resins used for the resin processing burn easily. Therefore, in most cases, the flame retardant must be further used together with the resins.

In that case, the flame retardant which is used together with, damages the drape of fiber or decreases the improvement of strength. Therefore, a large amount of resins is further required in order to prevent these negative effects. Such a use of a large amount of resins disturbs the flame retardancy and as a result, a large amount of flame retardant should be used, which often falls in a vicious cycle.

Conventionally, halogenated flame retardants have been widely used (Patent document 1). However, in recent years, from the viewpoint of prevention of environmental pollution, it has been requested to use a non-halogenated flame retardant. For example, the flame retardants using phosphorous compounds have been used (Patent documents 2 and 3). However, these phosphorous compounds have lower flame retardancy than halogenated compounds. Therefore, it is required to use larger amounts of flame retardant when the phosphorous compound is used instead of the halogenated flame retardant. As a result, there was a defect that it is required to use the same amounts of phosphorous compounds as a resin for processing or larger amounts of phosphorous compounds than a resin for processing.

In addition, since the flame retardant generally has a tendency of inducing a bleed-out of dye, there was a problem that the use of large amounts of the flame retardant lowers the dyeing fastness.

PRIOR ART DOCUMENTS

Patent Document

Patent document 1: Japanese Unexamined Patent Publication Tokkaihei 9-250086

Patent document 2: Japanese Unexamined Patent Publication Tokkaihei 11-269766

Patent document 3: Japanese Unexamined Patent Publication Tokkai 2000-126523

SUMMARY OF THE INVENTION

Problems to be Resolved by the Invention

Therefore, the first object of the present invention is to provide an aqueous dispersion of polyurethane resin which enables urethane resin processings such as a flame-retardant hard finish processing and a flame-retardant coating processing of polyester fiber, and also can sufficiently prevent the decrease of the dyeing fastness, by merely using much smaller amounts of the phosphorous flame retardant than ever.

The second object of the present invention is to provide a flame-retardant polyester fiber, which is obtained by using said aqueous dispersion of polyurethane resin, having a high flame retardancy and sufficiently suppressed decrease of dyeing fastness.

Also, the third object of the present invention is to provide a method for manufacturing the flame-retardant polyester fiber, which is obtained by using the above aqueous dispersion of polyurethane resin, having the high flame-retardancy and sufficiently suppressed decrease of dyeing fastness.

Means of Solving the Problems

As a result of extensive studies to achieve said objects, the inventors of the present invention have found that, in case of using an aqueous dispersion of polyurethane resin, obtained by a chain elongation reaction that is carried out in water by adding a specific chain extender to a dispersion liquid, wherein said liquid is obtained by dispersing and emulsifying a mixture, comprising a specific phosphorous compound and an urethane prepolymer and/or a neutralized urethane prepolymer material having an isocyanate group at the terminal, in water, as a resin processing agent, sufficient flame retardancy can be imparted to polyester fiber etc., by merely using much smaller amounts of phosphorous compounds than the cases where simple mixed solution comprised of an aqueous dispersed material of polyurethane resin and phosphorous compound is used, thereby completing the present invention.

Namely, the present invention is an aqueous dispersion of polyurethane resin obtained by a chain elongation reaction in water, by adding (C) at least one chain extender selected from a group consisting of water-soluble polyamines, hydrazine and derivatives thereof to a dispersion liquid obtained by emulsifying and dispersing a mixture in water, said mixture comprising (B) at least one compound selected from the phosphorous compounds represented by the following formula (1) and (A) an urethane prepolymer and/or a neutralized urethane prepolymer material which has an isocyanate group at the terminal, wherein an urethane prepolymer of said component (A) is an urethane prepolymer obtained by (a1) an organic polyisocyanate and (a2) a polymeric polyol, and said neutralized urethane prepolymer material is a neutralized material obtained by neutralizing an urethane prepolymer which is obtained by further using (a3) compound having an anionic hydrophilic group and at least two active hydrogens in a molecule together with said components (a1) and (a2); a flame-retardant polyester fiber obtained by finishing with a process liquid containing said aqueous dispersion of polyurethane resin to a polyester fiber and then drying it; and a method for manufacturing the flame-retardant polyester fiber comprising a step of providing said process liquid containing aqueous dispersion of polyurethane resin to the surface of polyester fiber so that the provided amount of said phosphorous compound (B) can be 0.1 to 2 parts by mass relative to 100 parts by mass of said polyester fiber, and a step of drying it.

in water by adding (C) at least one kind of chain extenders selected from a group consisting of the water-soluble polyamines, hydrazine and a derivative thereof to a dispersion liquid, which is obtained by emulsifying and dispersing in water a mixture of (B) at least one kind of compound selected from the phosphorous compounds represented by the general formula (1) and (A) an urethane prepolymer

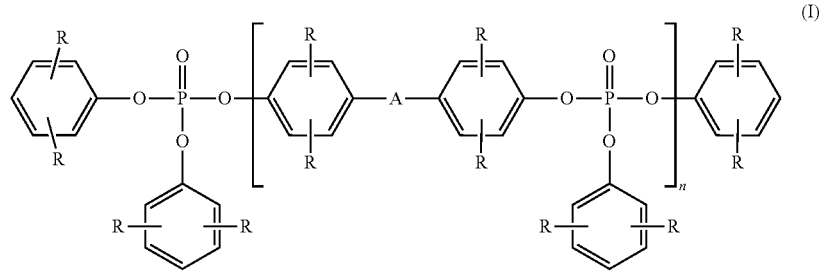

(I)

wherein, n is a number from 1 to 10, A is a single bond, —C(CH$_3$)$_2$—, —SO$_2$—, —S— or —O—, and R is each, independently a hydrogen atom, an alkyl group or a phenyl group.

It is preferable that the organic polyisocyanate of the component (a1), in the present invention, is an aliphatic diisocyanate or an alicyclic diisocyanate, and it is preferable that the polymeric polyol of the component (a2) is the polyol having an average molecular weight of 500 to 4000.

Also, it is preferable in the aqueous dispersion of polyurethane resin of the present invention that the content of phosphorous compound of the component (B) is 1 to 30 parts by mass relative to 100 parts by mass of polyurethane resin contained in the aqueous dispersion of polyurethane resin.

The component (A) in the present invention may be an urethane prepolymer and/or a neutralized urethane prepolymer material which is obtained by further adding a polyalcohol as a component (a4) together with the aforementioned components. In this case, it is preferable that the molecular weight of the polyalcohol of component (a4) is 200 or less.

Additionally, it is preferable in particular that an anionic hydrophilic group contained in the compound of component (a3), which is used when the component (A) is a neutralized urethane prepolymer material, is a carboxyl group.

In the flame-retardant polyester fiber, it is sufficient that the provided amount of the phosphorous compound (B) on the fiber is 0.1 to 2 parts by mass relative to 100 parts by mass of said polyester fiber.

Effect of the Invention

The aqueous dispersion of polyurethane resin of the present invention, which uses much lower amounts of phosphorous flame retardant than ever, can be used as a resin processing agent for a flame-retardant hard finish processing and a flame-retardant coating processing of polyester fiber. In addition, it can impart sufficient flame retardancy to the polyester fiber and also can sufficiently prevent the deterioration of dyeing fastness.

MODES FOR CARRYING OUT THE INVENTION

The aqueous dispersion of polyurethane resin of the present invention is obtained by a chain elongation reaction and/or a neutralized urethane prepolymer material having an isocyanate group at the terminal.

The urethane prepolymers of the component (A) are obtained from a mixture of the organic polyisocyanates of component (a1) and the polymeric polyols of component (a2).

Said organic polyisocyanates of component (a1) are not limited in particular and publicly-known organic polyisocyanate compounds can be used.

Examples of the organic polyisocyanates are aliphatic diisocyanates such as tetramethylenediisocyanate, 1,6-hexamethylenediisocyanate, dodecamethylenediisocyanate and trimethylhexamethylenediisocyanate; alicyclic diisocyanates such as isophorone diisocyanate, hydrogenated xylylene diisocyanate, 4,4'-dicyclohexylmethane diisocyanate, 3,3'-dimethyl-4,4'-dicyclohexylmethane diisocyanate, norbornane diisocyanate and lysine diisocyanate; aromatic diisocyanates such as m-phenylenediisocyanate, p-phenylenediisocyanate, 2,4-tolylene diisocyanate, 2,6-tolylene diisocyanate, 4,4'-diphenylmethane diisocyanate, 2,4-diphenylmethane diisocyanate, 3,3'-dimethyl-4,4'-biphenylene diisocyanate, 3,3'-dichloro-4,4'-biphenylene diisocyanate, 1,5-naphthalene diisocyanate, tolidine diisocyanate, tetramethylene xylylene diisocyanate and xylylene diisocyanate. Only one kind of these organic polyisocyanates may be used, or two or more kinds of them may be used in combination.

In the present invention, from the viewpoint of inhibiting the yellowing of polyurethane resin, it is preferable to use the aliphatic diisocyanates or the alicyclicdiisocyanates among these organic polyisocyanates. In particular, it is preferable to use the isophorone diisocyanate or the dicyclohexylmethane diisocyanate.

In the present invention, the polymeric polyols of aforementioned component (a2) are also not limited in particular. Examples of them are polyester polyol, polycarbonate polyol, polyether polyol and dimerdiol.

Examples of said polyester polyol are a polyester polyol obtained by a dehydration condensation reaction of a diol component with a dicarboxylic acid component such as a dicarboxylic anhydride or an ester-forming derivative etc.; a polyester polyol obtained by a ring-opening polymerization reaction of a cyclic ester compound such as ε-caprolactone etc.; and a polyester polyol obtained by copolymerizing these polyols.

Examples of the diol component are ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol having molecular weight of 300 to 1000, dipropylene glycol, tripropylene glycol, bis-hydroxyethoxybenzene, 1,4-cyclohexanedimethanol, bisphenol A, bisphenol S, hydrogenated bisphenol A, hydroquinone and an alkylene oxide adduct thereof.

Examples of the dicarboxylic component are dimer acid, succinic acid, adipic acid, azelaic acid, sebacic acid, dodecanedicarboxylic acid, maleic acid anhydride, fumaric acid, 1,3-cyclopentanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bisphenoxyethane-p,p'-dicarboxylic acid, and an anhydride or an ester-forming derivative thereof.

Specific examples of polyester polyol that can be used as the component (a2) are polyethylene adipatediol, polybutylene adipatediol, polyhexamethylene isophthalate adipatediol, 3-methyl-1,5-pentane isophthalatediol, 3-methyl-1,5-pentaneterephthalatediol and a polycondensation product of 1,6-hexanediol and dimer acid.

Examples of polycarbonate polyol are polycarbonate polyol obtained by reacting glycol such as 1,4-butanediol, 1,6-hexanediol and diethylene glycol with diphenylcarbonate or phosgene etc.

Specific examples of polycarbonate polyol that can be used as the component (a2) are polyhexamethylene carbonatediol and 3-methyl-1,5-pentanediol carbonatediol etc.

Examples of polyether polyol suitable for the present invention are polyether polyols obtained by polymerizing one or more polyols selected from polyols such as ethylene glycol, diethylene glycol, triethylene glycol, propylene glycol, trimethylene glycol, 1,3-butanediol, 1,4-butanediol, 1,5-pentanediol, 1,6-hexanediol, neopentyl glycol, glycerin, trimethylol ethane, trimethylol propane, sorbitol, sucrose, bisphenol A, bisphenol S and hydrogenated bisphenol A; and polyether polyols obtained by addition polymerization reaction of compound having at least two active hydrogens and one or more monomers selected from monomers such as ethylene oxide, propylene oxide, butylene oxide, styrene oxide, epichlorohydrin, tetrahydrofuran and cyclohexylene oxide etc.

Examples of the compound having at least two active hydrogens are aforementioned polyol, aconitic acid, trimellitic acid, hemimellitic acid, phosphoric acid, ethylene diamine, diethylene triamine, triisopropanolamine, pyrogallol, dihydroxybenzoic acid, hydroxyphthalic acid and 1,2,3-propanetrithiol etc.

As for the polyether polyol, it may be a block copolymer or may be a random copolymer.

Specific examples are a homopolymer, a block copolymer and a random copolymer etc. of glycol such as polytetramethylene glycol, polypropylene glycol and polyethylene glycol.

Examples of dimerdiol are those having a diol obtained by reducing a polymerized fatty acid as a main component. Examples of such a polymerized fatty acid are those obtained by the Diels-Alder bimolecular polymerization reaction of unsaturated fatty acid having 18 carbon atoms such as oleic acid and linoleic acid, dry oil fatty acid and semidry oil fatty acid, and lower monoalcohol esters of these fatty acids, in the presence of or in the absence of catalyst.

Various kinds of polymerized fatty acid comprising 0 to 5 percent concentration by mass of monocarboxylic acid having 18 carbon atoms, 65 to 98 percent concentration by mass of dimer acid having 36 carbon atoms and 0 to 30 percent concentration by mass of trimer acid having 54 carbon atoms are in the market and these polymerized fatty acids are available in the present invention.

It is possible to use polyols of polyether•ester type, obtained by combining a polyether polyol with a polyester polyol, as a polymeric polyol of the aforementioned component (a2).

Only one of these polymeric polyols may be used in the present invention or two or more of them may be used in combination. It is desirable that the polymeric polyol of component (a2) used in the present invention has an average molecular weight from 500 to 4000.

In cases where the neutralized urethane prepolymer material is used as the component (A), the mixture is used wherein the component (a3), which is a compound having an anionic hydrophilic group and at least two active hydrogens in a molecule, is further used together with the organic polyisocyanate of component (a1) and the polymeric polyol of component (a2).

Said compounds used as the component (a3) are not limited in particular as long as they have anionic hydrophilic group(s) and at least two active hydrogens in a molecule. Examples of them are a low molecular weight diol containing carboxyl groups such as 2,2-dimethylol propionic acid, 2,2-dimethylol butanoic acid and 2,2-dimethylol heptanoic acid; a low molecular weight diol containing sulfo groups such as 2-sulfo-1,3-propanediol and 2-sulfo-1,4-butanediol, and a diol salt thereof. Examples of a neutralizing agent are organic amines such as trialkylamines like trimethylamine, triethylamine, tri-n-propylamine and tributylamine, tertiary amines like triethanolamine etc., N-alkyl-N,N-dialkanolamines like N-methyl-N,N-diethanolamine etc., N,N-dialkylalkanolamines like N,N-diethylethanolamine etc. and N,N-dialkyl-N,N-dialkanolamines like N,N-dimethyl-N,N-diethanolamine etc.; and basic compounds such as ammonia, sodium hydroxide, potassium hydroxide and lithium hydroxide.

It is preferable that a using amount of the neutralizing agent is 0.2 to 2 moles relative to 1 mol of the anionic group and 0.5 to 1.5 moles are more preferable.

It is preferable that the compounds of component (a3) in the present invention are the compounds which have carboxyl group(s) as the anionic hydrophilic group or the salts thereof. The preferable salts are the salts of trialkylamines like a triethylamine.

These compounds of component (a3) may be used alone or two or more of them may be used in combination.

It is preferable that the content of the carboxyl group is 0.7 to 2 parts by mass relative to 100 parts by mass of polyurethane resin in the aqueous dispersion of polyurethane resin. When the content of the carboxyl group is less than 0.7 parts by mass, it tends to be difficult to emulsify or the emulsion stability tends to be insufficient. When it is more than 2 parts by mass, it tends to be difficult to treat since the viscosity of the aqueous dispersion of polyurethane resin becomes high.

In cases where the compound of component (a3) is an acid, the anionic hydrophilic group contained in the urethane prepolymer of component (A) may be neutralized after obtaining said component (A), which is obtained by the reaction of the organic polyisocyanate of component (a1), the polymeric polyol of component (a2) and the compound of component (a3). Or the neutralized component (A) may be obtained by the reaction of the organic polyisocyanate of component (a1), the polymeric polyol of component (a2)

and the neutralized compound of component (a3). Furthermore, after mixing the component (B) with the urethane prepolymer obtained by reacting components from (a1) to (a3), the anionic group contained in the said urethane prepolymer may be neutralized. This embodiment is also included in the present invention.

When the urethane prepolymer and/or the neutralized urethane prepolymer material of component (A) are synthesized, the low molecular weight polyalcohol of component (a4) may be used as a chain extender. In this case, it is preferable in particular to use polyalcohol having 200 or less in a molecular weight.

Examples of the low molecular weight polyalcohol are ethylene glycol, diethylene glycol, propylene glycol, 1,4-butanediol, neopentyl glycol, 1,6-hexanediol, trimethylolpropane, pentaerythritol and sorbitol. These low molecular weight polyalcohols of component (a4) may be used alone or two or more of them may be used in combination.

The methods for manufacturing the urethane prepolymer and the neutralized urethane prepolymer material of component (A) used for the present invention are not limited in particular. For example, they can be manufactured by a isocyanate polyaddition reaction method in one step or in multistep, for examples, under the condition of temperatures from 40 to 150° C.

When manufactured, optionally, it is possible to add reaction catalysts such as dibutyltin dilaurate, stannous octoate, dibutyltin-2-ethylhexoate, triethylamine, triethylene diamine and N-methylmorpholine, or reaction inhibitors such as phosphoric acid, sodium hydrogenphosphate and p-toluenesulfonic acid.

In the present invention, in the stage of reaction or after the end of reaction, it is possible to add an organic solvent which does not react to the isocyanate group.

Examples of these organic solvents are acetone, methylethylketone, methylisobutylketone, toluene, xylene, tetrahydrofuran, dioxane, dimethyl formamide, N-methyl pyrolidone, ethyl acetate and butyl acetate.

When said urethane prepolymer or the neutralized urethane prepolymer material of component (A) is manufactured, it is preferable to use each component so that the molar ratio of NCO/OH in the reaction system is 1.1/1.0 to 1.7/1.0 and, in particular, it is more preferable that the molar ratio of NCO/OH is 1.2/1.0 to 1.5/1.0.

At the end of the reaction, it is preferable that the content ratio of free isocyanate group in the urethane prepolymer or the neutralized urethane prepolymer material is 0.8 to 5.0 percent concentration by mass.

In cases where the content ratio of free isocyanate group is less than 0.8 percent concentration by mass at the end of the reaction, a large amount of organic solvent should be used, in order to prevent the remarkable increase of viscosity of the reaction system at the time of the reaction. Therefore, it tends to be disadvantageous from the standpoint of the cost or it tends to become difficult to emulsify and disperse the reaction products. On the other hand, in cases where the content ratio of free isocyanate group at the end of the reaction is more than 5.0 percent concentration by mass, the stability of dispersion liquid after the emulsification and the stability of dispersion liquid after the chain-extending reaction by a chain extender change remarkably, therefore, the storage stability over time or the processing stability of the products is apt to be an obstacle.

The phosphorous compound of component (B) is a compound represented by the general formula (B). Specifically, it includes the following phosphorous compounds from (1) to (4).

Phosphorous compound (1)

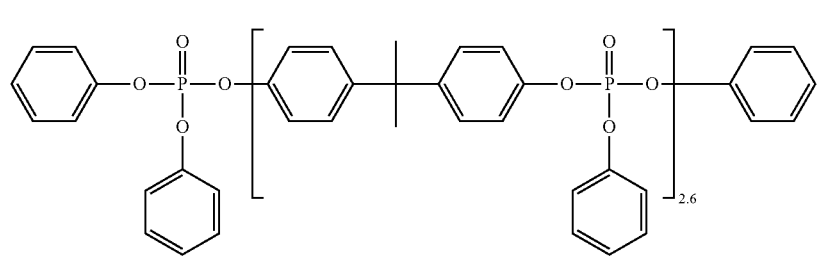

Phosphorous compound (2)

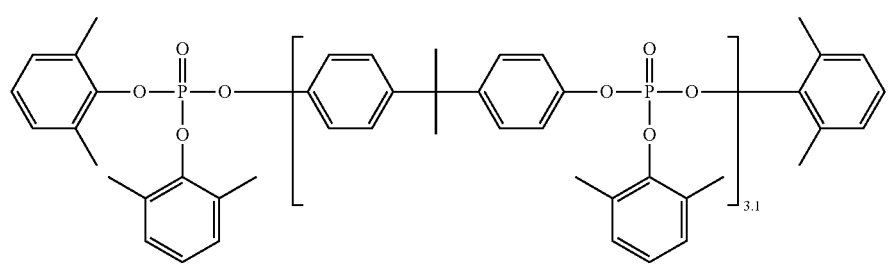

Phosphorous compound (3)

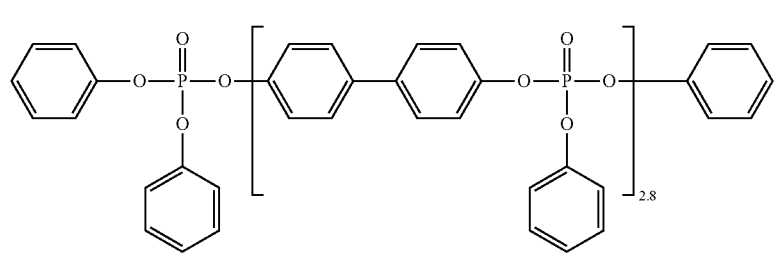

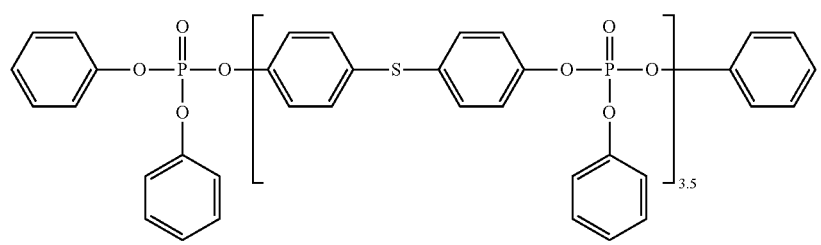

Phosphorous compound (4)

These phosphorous compounds may be used alone, or two or more compounds of them may be used in combination.

In the aqueous dispersion of polyurethane resin of the present invention, it is preferable that the content of said phosphorous compound of component (B) is 1 to 30 parts by mass relative to 100 parts by mass of polyurethane resin, and in particular, 3 to 15 parts by mass is more preferable. When the content of phosphorous compound of component (B) is less than 1 part by mass, the flame retardancy of the polyurethane resin is apt to be insufficient. When the content of phosphorous compound of component (B) is more than 30 parts by mass, the emulsification and dispersion of the reaction products tends to be difficult and the storage stability of the products over time tends to decrease.

In case of blending the phosphorous compound of component (B) with the urethane prepolymer or the neutralized urethane prepolymer material of component (A), after obtaining the urethane prepolymer or the neutralized urethane prepolymer material of component (A) without using a solvent, the phosphorous compound may be blended with an organic solvent and then melted. Or after obtaining the urethane prepolymer or the neutralized urethane prepolymer material of component (A) in an organic solvent, the phosphorous compound may be blended with it and then melted.

The aqueous dispersion of polyurethane resin of the present invention is obtained by adding the chain extender of component (C) into the emulsified solution obtained by dispersing the mixed solution of the urethane prepolymer of component (A) and the phosphorous compound of component (B) in water, and carrying out the chain elongation reaction in water.

As for the chain extender of component (C), at least one compound selected from a group consisting of water-soluble polyamine, hydrazine and derivatives thereof is used.

Examples of said water-soluble polyamine are primary or secondary polyamines such as ethylene diamine, propylene diamine, tetramethylene diamine, hexamethylene diamine, diaminocyclohexyl methane, hydrazine, piperazine, 2-methylpiperazine, tolylenediamine, xylylene diamine, isophorone diamine, norbornane diamine, diethylene triamine and triethylene tetramine. Examples of the derivatives of water-soluble polyamine are amido amine derived from diprimary amine and monocarboxylic acid, and monoketimine of diprimary amine etc.

Examples of the hydrazine derivatives are aliphatic water-soluble hydrazine compounds having 2 to 4 carbon atoms and having at least two hydrazino groups in a molecule, such as 1,1'-ethylene dihydrazine, 1,1'-trimethylene dihydrazine and 1,1'-(1,4-butylene)dihydrazine; and dihydrazide compounds of dicarboxylic acid having 2 to 10 carbon atoms, such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and itaconic acid dihydrazide.

These chain extenders may be used alone, or two or more of them may be used in combination.

The reaction of the urethane prepolymer or the neutralized urethane prepolymer material of component (A) with the chain extender of component (C) is carried out commonly under the reaction temperature within the range from 20 to 50° C., and it is completed in 30 to 120 minutes after blending the urethane prepolymer or the neutralized urethane prepolymer material of component (A) with the chain extender of component (C). At this time, it is preferable to use the chain extender of the amount wherein 0.9 to 1.1 equivalents of amino groups are contained, with respect to the free isocyanate group of the urethane prepolymer or the neutralized urethane prepolymer material of component (A).

In the present invention, an emulsifying agent may optionally be used in order to emulsify and disperse the mixed solution of the urethane prepolymer or neutralized urethane prepolymer material of component (A) with the phosphorous compound of component (B) in water.

As the emulsifying agent, the agents already known as a non-ionic surfactant or an anionic surfactant etc. are usable.

Examples of the non-ionic surfactant are polyoxyethylene alkylether; polyoxyalkylene glycols such as polyoxyethylene glycol and block polymer of polyoxyethylene and polyoxypropylene; polyoxyalkylene ether derivatives such as polyoxy ethylene alkylphenyl ether and polyoxyethylene styrenated phenyl ether; and fatty acid ester and aromatic carboxylic acid ester thereof.

Examples of the anionic surfactant are sulfate esterified compounds of the polyoxyethylene alkylether, polyoxyalkylene glycols or polyoxyalkylene ether derivatives; and aromatic sulphonic acids etc.

In the aqueous dispersion of polyurethane resin of the present invention, a method for emulsification dispersion is not limited in particular. However, it is preferable that, optionally blending the emulsifying agent into the mixed solution of the urethane prepolymer or neutralized urethane prepolymer material of component (A) with the phosphorous compound of component (B), then emulsification dispersing it in water by using a homomixer or a homogenizer etc., and after that, the chain elongation is performed by adding the chain extender of component (C).

In order to suppress the reaction of water with the isocyanate group of urethane prepolymer or neutralized urethane prepolymer material of component (A) as much as possible, it is preferable that the emulsification dispersion is carried out within the temperature range from room temperature to 40° C. Further, reaction inhibitors such as a phosphoric acid and sodium hydrogenphosphate may be added.

In the aqueous dispersion of polyurethane resin of the present invention, in cases where an organic solvent is used when the urethane prepolymer or neutralized urethane prepolymer material of component (A) is manufactured, it is preferable to remove the organic solvent by a vacuum distillation etc. after blocking the isocyanate group at the terminal as appropriate. When the organic solvent is removed, for the purpose of maintaining emulsifying properties, there may be added anionic surfactants such as salt of higher fatty acid, resinate, salt of long-chain fatty alcohol sulfuric acid ester, salt of higher alkyl sulfonic acid, salt of alkyl aryl sulfonic acid, sulfonated castor oil and sulfosuccinic acid ester salt, and non-ionic surfactants such as reaction products of ethylene oxide with long-chain fatty alcohol or phenols.

The flame-retardant polyester fibers of the present invention are obtained by processing the polyester fibers using a process liquid containing the aqueous dispersion of polyurethane resin of the present invention, and then drying it.

As the process liquid, the aqueous dispersion of polyurethane resin of the present invention itself may be used, however, it is preferable to use said aqueous dispersion of polyurethane resin, which is diluted as appropriate.

The concentration of the polyurethane resin in the process liquid and the components other than said aqueous dispersion of polyurethane resin are not limited in particular, however, it is preferable that the concentration of polyurethane resin in the process liquid is 1 to 20 percent concentration by mass.

When the polyester fiber is processed by the process liquid which contains the aqueous dispersion of polyurethane resin of the present invention, the amount of the phosphorous compound required for being flame-retardant is much smaller than the amount of the phosphorous compound required when the polyester fiber is processed by a process liquid obtained by blending a conventional dispersion liquid of polyurethane resin with a conventional dispersion liquid of phosphorous compound.

The reason for the above facts is not clear, however, it can be thought as follows.

Namely, the phosphorous compound in the process liquid which contains the aqueous dispersion of polyurethane resin of the present invention, the said phosphorous compound exists in a micelle of polyurethane resin emulsion, therefore, both of the polyurethane resin and the phosphorous compound exist together as a fine dispersion in the aqueous dispersion of polyurethane resin. Accordingly, the flame retardancy of the phosphorous compound provided to a material, which is treated by the process liquid, is brought out effectively.

As for the polyester fiber processed by using the process liquid, that contains the aqueous dispersion of polyurethane resin of the present invention, the forms of the fiber and methods for processing are not limited in particular. For example, it is possible to obtain the flame retardant polyester fibers by providing the aqueous dispersion of polyurethane resin of the present invention itself or the one diluted to the various kinds of polyester fiber materials, such as fabrics and nonwoven cloths etc., by any ways such as a padding method, a coating method and a spray method, and drying it. In this way, it becomes possible to provide the sufficient flame retardancy and improved strength against tension, tearing and abrasion etc. to the processed cloths.

In addition, the drying temperature after the processing of the polyester fiber materials with the process liquid, which contains the aqueous dispersion of polyurethane resin of the present invention, is not limited in particular. An air drying at room temperature or heat drying may be carried out. Generally, from the viewpoint of processing efficiency, the drying is carried out in the temperature range from 80 to 200° C. for approximately 30 seconds to 3 minutes. When the polyester fiber materials are processed, aqueous cross-linking agents such as the polyisocyanates, carbodiimides, oxazolines and epoxides etc. may be further used, and also any flame retardants other than the compound represented by the formula (I) may be further used as an auxiliary agent for providing the flame retardancy to the fiber materials.

The amount of polyurethane resin which is provided to flame retardant polyester fibers obtained is not limited in particular, however, it is preferable that the provided amount of polyurethane resin is 0.5 to 10 parts by mass relative to 100 parts by mass of polyester fibers after drying. In addition, the amount of phosphorus compound, which is provided to flame retardant polyester fibers obtained, is not also limited in particular. According to the present invention, 0.1 to 2 parts by mass of the provided amount of phosphorous compound, which are remarkably smaller amounts than conventional, relative to 100 parts by mass of polyester fibers, are enough to attain the sufficient flame retardancy.

This invention will now be described in more detail referring to Examples, but it should be understood that the present invention is not to be limited in any way thereby.

Example 1

101.3 g of 3-methyl-1,5-pentaneterephthalatediol (the average molecular weight is 2000) as the component (a2), 1.3 g of 1,4-butanediol as the component (a4) and 6.0 g of dimethylol butanoic acid as the component (a3) were added to a four neck flask equipped with a stirring machine, a reflux condenser tube, a thermometer and a nitrogen-blowing tube. Further, 0.005 g of dibutyltin dilaurate and 60.0 g of methyl ethyl ketone as a solvent were added and blended uniformly, and then, 31.3 g of isophorone diisocyanate as the component (a1) was added. After reacting the obtained mixture at 80° C. for 180 minutes, the methyl ethyl ketone solution of urethane prepolymer was obtained as the component (A), wherein the content of free isocyanate group was 2.1 percent concentration by mass with respect to the nonvolatile content.

15.0 g of the phosphorous compound (1) as the component (B) was added to this solution and blended uniformly, and then, 4.1 g of triethylamine as the component (a1) was added. By doing this, an anionic group belonging to said component (A) was neutralized and the solution was moved to another container. Then, while adding gradually 359 g of water at 30° C. or less, the emulsification dispersion was carried out by using a disper impeller. After, as the chain extender of component (C), 20.0 g of isophorone diamine water solution having 30 percent concentration by mass was added to this emulsification dispersion liquid, the reaction was performed for 90 minutes. Next, the solvent in the dispersion liquid of polyurethane resin obtained was removed at 50° C. under reduced pressure to obtain aqueous dispersion of polyurethane resin which contains 30 percent concentration by mass of polyurethane resin as the nonvolatile content, and 3 percent concentration by mass of the phosphorous compound (1) as the nonvolatile content.

A commercially available polyester felt was processed by a padding process using a process liquid, which is obtained by diluting the aqueous dispersion of polyurethane resin obtained so as to contain 15 percent concentration by mass of polyurethane resin, under the condition that a drawing rate is 60 percent. Then, a resin processed cloth was obtained after drying at 140° C. for 3 minutes.

Example 2

In the same way as Example 1, except that 15.0 g of phosphorous compound (2) was used instead of 15.0 g of phosphorous compound (1), the aqueous dispersion of polyurethane resin, which contains 30 percent concentration by mass of polyurethane resin as the nonvolatile content, and 3 percent concentration by mass of the phosphorous compound (2) as the nonvolatile content, was obtained.

A resin processed cloth was obtained in the same way as Example 1, using the aqueous dispersion of polyurethane resin obtained.

Example 3

In the same way as Example 1, except that 15.0 g of phosphorous compound (3) was used instead of 15.0 g of phosphorous compound (1), the aqueous dispersion of polyurethane resin, which contains 30 percent concentration by mass of polyurethane resin as the nonvolatile content, and 3 percent concentration by mass of phosphorous compound (3) as the nonvolatile content, was obtained.

A resin processed cloth was obtained in the same way as Example 1, using the aqueous dispersion of polyurethane resin obtained.

Example 4

In the same way as Example 1, except that 15.0 g of phosphorous compound (4) was used instead of 15.0 g of phosphorous compound (1), the aqueous dispersion of polyurethane resin, which contains 30 percent concentration by mass of polyurethane resin as the nonvolatile content and 3 percent concentration by mass of phosphorous compound (4) as the nonvolatile content, was obtained.

A resin processed cloth was obtained in the same way as Example 1, using the aqueous dispersion of polyurethane resin obtained.

Example 5

52.3 g of 3-methyl-1,5-pentaneterephthalatediol (the average molecular weight is 2000) and 52.3 g of polyhexamethylenecarbonatediol (the average molecular weight is 2000) as the component (a2), and 5.8 g of dimethylol butanoic acid as the component (a3) were added to a four neck flask equipped with a stirring machine, a reflux condenser tube, a thermometer and a nitrogen-blowing tube. Further, 0.005 g of dibutyltin dilaurate and 59.7 g of methyl ethyl ketone as a solvent were added and blended uniformly, and then, 29.0 g of isophorone diisocyanate as the component (a1) was added. After reacting the obtained mixture at 80° C. for 200 minutes, the methyl ethyl ketone solution of urethane prepolymer was obtained as the component (A), wherein the content ratio of free isocyanate group was 2.4 percent with respect to the nonvolatile content.

15.0 g of the phosphorous compound (2) as the component (B) was added to the obtained solution and blended uniformly, and then, 4.0 g of triethylamine was added. By doing this, an anionic group belonging to said component (A) was neutralized and the solution was moved to another container. Then, while adding gradually 357 g of water at 30° C. or less, the emulsification dispersion was carried out by using a disper impeller. As the component (C), 22.3 g of isophorone diamine water solution having 30 percent concentration by mass was added to this emulsification dispersion liquid, and then the reaction was carried out for 90 minutes. Next, the solvent of the dispersion liquid of polyurethane resin obtained was removed at 50° C. under reduced pressure to obtain the aqueous dispersion of polyurethane resin, which contains 30 percent concentration by mass of polyurethane resin as the nonvolatile content and 3 percent concentration by mass of the phosphorous compound (2) as the nonvolatile content.

A resin processed cloth was obtained in the same way as Example 1, using the aqueous dispersion of polyurethane resin obtained.

Example 6

98.9 g of polyhexamethylenecarbonatediol (the average molecular weight is 2000) as the component (a2), 1.5 g of neopentyl glycol as the component (a4) and 6.3 g of dimethylol butanoic acid as the component (a3) were added to a four neck flask equipped with a stirring machine, a reflux condenser tube, a thermometer and a nitrogen-blowing tube. Further, 0.005 g of dibutyltin dilaurate and 61.5 g of methyl ethyl ketone as a solvent were added and blended uniformly, and then, 37.0 g of dicyclohexylmethane diisocyanate as the component (a1) was added. After reacting the obtained mixture at 80° C. for 240 minutes, the methyl ethyl ketone solution of urethane prepolymer was obtained as the component (A), wherein the content of free isocyanate group was 2.1 percent by mass with respect to the nonvolatile content.

15.0 g of the phosphorous compound (2) as the component (B) was added to the obtained solution and blended uniformly, and then, 4.3 g of triethylamine were added. By doing this, an anionic group belonging to said component (A) was neutralized and the solution was moved to another container. Then, while adding gradually 365 g of water at 30° C. or less, the emulsification dispersion was carried out by using a disper impeller. As the component (C), 10.5 g of ethylenediamine water solution having 20 percent concentration by mass was added to this emulsification dispersion liquid obtained, and then the reaction was carried out for 90 minutes.

Next, the solvent in the dispersion liquid of polyurethane resin was removed at 50° C. under reduced pressure to obtain the aqueous dispersion of polyurethane resin, which contains 30 percent concentration by mass of polyurethane resin as the nonvolatile content and 3 percent concentration by mass of the phosphorous compound (2) as the nonvolatile content.

The resin processed cloth was obtained in the same way as Example 1, using the aqueous dispersion of polyurethane resin obtained.

Example 7

56.1 g of 3-methyl-1,5-pentaneisophthalatediol (the average molecular weight is 2000) and 28.0 g of polytetramethylene glycol (the average molecular weight is 2000) as the component (a2), 1.6 g of 1,4-butanediol and 0.9 g of trimethylolpropane as the component (a4) and 7.8 g of dimethylol butanoic acid as the component (a3) were added to a four neck flask equipped with a stirring machine, a reflux condenser tube, a thermometer and a nitrogen-blowing tube. Further, 0.005 g of dibutyltin dilaurate and 60.1 g of methyl ethyl ketone as a solvent were added and blended uniformly, and then, 45.9 g of dicyclohexylmethane diisocyanate as the component (a1) was added. After reacting the obtained mixture at 80° C. for 220 minutes, the methyl ethyl ketone solution of urethane prepolymer was obtained as the component (A), wherein the content ratio of free isocyanate group is 3.1 percent with respect to the nonvolatile content.

15.0 g of the phosphorous compound (4) as the component (B) was added to the obtained solution and blended uniformly, and then, 5.2 g of triethylamine was added. By doing this, an anionic group belonging to said component (A) was neutralized and the solution was moved to another container. Then, while adding gradually 362 g of water at 30° C. or less to the obtained mixture, the emulsification dispersion was carried out by using a disper impeller. Next, 15.0 g of piperazine water solution having 30 percent concentration by mass as the component (C), was added to this emulsification dispersion liquid, the reaction was carried out for 90 minutes.

The solvent in the dispersion liquid of polyurethane resin obtained was removed at 50° C. under reduced pressure to obtain the aqueous dispersion of polyurethane resin, which contains 30 percent concentration by mass of polyurethane resin as the nonvolatile content and 3 percent concentration by mass of phosphorous compound (4) as the nonvolatile content.

The resin processed cloth was obtained in the same way as Example 1, using the aqueous dispersion of polyurethane resin obtained.

Example 8

106.3 g of polyhexamethyleneisophthalate adipatediol (the average molecular weight is 2000) as the component (a2) was added to a four neck flask equipped with a stirring machine, a reflux condenser tube, a thermometer and a nitrogen-blowing tube. Further, 0.005 g of dibutyltin dilaurate and 62.6 g of methyl ethyl ketone as a solvent were added and blended uniformly, and then, 39.8 g of dicyclohexylmethane diisocyanate as the component (a1) was added. After reacting the obtained mixture at 80° C. for 200 minutes, the methyl ethyl ketone solution of urethane prepolymer was obtained as the component (A), wherein the content ratio of free isocyanate group is 2.6 percent with respect to the nonvolatile content.

15.0 g of the phosphorous compound (2) as the component (B) was added to the obtained solution and blended uniformly, and then, 6.0 g of a compound obtained by addition reaction of 20 mol of ethylene oxide with tristyrenated phenol (component (a2)) was blended as an emulsifier and the solution was moved to another container. Then, while adding gradually 353 g of water at 30° C. or less to the mixture obtained, the emulsification dispersion was carried out by using a disper impeller. As the component (C), 19.5 g of piperazine water solution having 20 percent concentration by mass was added to this emulsification dispersion liquid, and then the reaction was performed for 90 minutes. Next, the solvent in the dispersion liquid of polyurethane resin obtained was removed at 50° C. under reduced pressure to obtain the aqueous dispersion of polyurethane resin, which contains 30 percent concentration by mass of polyurethane resin as the nonvolatile content and 3 percent concentration by mass of the phosphorous compound (2) as the nonvolatile content.

A resin processed cloth was obtained in the same way as Example 1, using the aqueous dispersion of polyurethane resin obtained.

Example 9

75.2 g of polyhexamethyleneisophthalate adipatediol (the average molecular weight is 1000) and 30.1 g of polyte-
tramethyleneglycol (the average molecular weight is 2000) as the component (a2), and 1.4 g of 1,4-butanediol as the component (a4) were added to a four neck flask equipped with a stirring machine, a reflux condenser tube, a thermometer and a nitrogen-blowing tube. Further, 0.005 g of dibutyltin dilaurate and 62.6 g of methyl ethyl ketone as a solvent were added and blended uniformly, and then, 39.4 g of dicyclohexylmethane diisocyanate as the component (a1) was added. After reacting the obtained mixture at 80° C. for 190 minutes, the methyl ethyl ketone solution of urethane prepolymer was obtained as the component (A), wherein the content of free isocyanate group was 2.6 percent concentration by mass with respect to the nonvolatile content.

15.0 g of the phosphorous compound (2) was added to the obtained solution and blended uniformly. Then, 6.0 g of the compound, which was an addition product of 20 mol of ethylene oxide with tristyrenated phenol, were blended as an emulsifier and the solution was moved to another container. Then, while adding gradually 353 g of water at 30° C. or less to the obtained mixture, the emulsification dispersion was carried out by using a disper impeller. As the component (C), 19.5 g of piperazine water solution of 20 percent concentration by mass were added to this emulsification dispersion liquid, and then the reaction was carried out for 90 minutes. Next, the solvent in the dispersion liquid of polyurethane resin obtained was removed at 50° C. under reduced pressure to obtain the aqueous dispersion of polyurethane resin, which contains 30 percent concentration by mass of polyurethane resin as the nonvolatile content and 3 percent concentration by mass of the phosphorous compound (2) as the nonvolatile content.

A resin processed cloth was obtained in the same way as Example 1, using the aqueous dispersion of polyurethane resin obtained.

Example 10

107.3 g of polyhexamethylenecarbonatediol (the average molecular weight is 2000) and 2.2 g of 1,4-butanediol as the component (a2), and 2.4 g of dimethylol butanoic acid as the component (a3) were added to a four neck flask equipped with a stirring machine, a reflux condenser tube, a thermometer and a nitrogen-blowing tube. Further, 0.005 g of dibutyltin dilaurate and 59.3 g of methyl ethyl ketone were added and blended uniformly, then, 29.8 g of isophorone diisocyanate as the component (a1) was added. By reacting the obtained mixture at 80° C. for 200 minutes, the methyl ethyl ketone solution of urethane prepolymer was obtained as the component (A), wherein the content of free isocyanate group was 2.4 percent concentration by mass with respect to the nonvolatile content.

15.0 g of the phosphorous compound (3) as the component (B) was added to the obtained solution and blended uniformly. Then, after neutralizing the solution by 1.6 g of triethylamine, the solution was moved to another container. 4.5 g of a compound which is an ammonium salt of the sulfonated product obtained by sulfonating the adducts obtained by the addition reaction of 15 mol of ethylene oxide with tristyrenated phenol, was added as an emulsifier. Then, while adding gradually 353 g of water at 30° C. or less to the obtained mixture, the emulsification dispersion was carried out by using a disper impeller. As the component (C), 22.5 g of isophorone diamine water solution of 30 percent concentration by mass was added to this emulsification dispersion liquid, and then the reaction was carried out for 90 minutes. Next, the solvent in the obtained dispersion liquid of polyurethane resin was removed at 50° C. under reduced pressure to obtain the aqueous dispersion of polyurethane resin, which contains 30 percent concentration by mass of polyurethane resin as the nonvolatile content and 3 percent concentration by mass of the phosphorous compound (3) as the nonvolatile content.

A resin processed cloth was obtained in the same way as Example 1, using the aqueous dispersion of polyurethane resin obtained.

Example 11

98.0 g of polyhexamethylenecarbonatediol (the average molecular weight is 2000) as the component (a2), and 19.2 g of dimethylol propionic acid as the component (a3) were added to a four neck flask equipped with a stirring machine, a reflux condenser tube, a thermometer and a nitrogen-blowing tube. Further, 0.005 g of dibutyltin dilaurate and 64.0 g of methyl ethyl ketone were added and blended uniformly, and then, 66.4 g of isophorone diisocyanate as the component (a1) was added. By reacting the obtained mixture at 80° C. for 240 minutes, the methyl ethyl ketone solution of urethane prepolymer was obtained as the component (A), wherein the content of free isocyanate group was 4.4 percent concentration by mass with respect to the nonvolatile content.

275.4 g of the phosphorous compound (1) as the component (B) was added to the obtained solution and blended uniformly. Then, 13.8 g of triethylamine were added in order to neutralize the anionic group, which is contained in the said component (A), and 400 g of the obtained solution was moved to another container. Then, while adding gradually 670 g of water at 30° C. or less to the transferred 400 g of the solution, the emulsification dispersion was carried out by using a disper impeller. As the component (C), 11.2 g of ethylenediamine water solution of 25 percent concentration by mass was added to this emulsification dispersed material obtained, and then the reaction was carried out for 90 minutes. Next, the solvent in the obtained dispersion liquid of polyurethane resin was removed at 50° C. under reduced pressure to obtain the aqueous dispersion of polyurethane resin, which contains 14 percent concentration by mass of polyurethane resin as the nonvolatile content and 21 percent concentration by mass of the phosphorous compound (1) as the nonvolatile content.

A resin processed cloth was obtained in the same way as Example 1, using the aqueous dispersion of polyurethane resin obtained.

Example 12

70.0 g of polyhexylene adipate polyesterpolyol (the average molecular weight is 1000) as the component (a2) and 18 g of dimethylol propionic acid as the component (a3) were added to a four neck flask equipped with a stirring machine, a reflux condenser tube, a thermometer and a nitrogen-blowing tube. Further, 0.005 g of dibutyltin dilaurate and 65.1 g of methyl ethyl ketone were added and blended uniformly, and then, 84.0 g of isophorone diisocyanate as the component (a1) was added. After reacting the obtained mixture at 80° C. for 240 minutes, the methyl ethyl ketone solution of urethane prepolymer was obtained as the component (A), wherein the content of free isocyanate group is 4.4 percent concentration by mass with respect to the nonvolatile content.

263.0 g of the phosphorous compound (1) as the component (B) was added to the obtained solution and blended uniformly, and then, 13.0 g of triethylamine was added in order to neutralize the anionic group contained in said component (A), and 400 g of the solution was moved to another container. Then, while adding gradually 670 g of water at 30° C. or less to 400 g of the solution transferred, the emulsification dispersion was carried out by using a disper impeller. As the component (C), 14.8 g of ethylenediamine water solution having 25 percent concentration by mass was added to the emulsification dispersed material obtained, and then the reaction was performed for 90 minutes. Next, the solvent in the obtained dispersion liquid of polyurethane resin was removed at 50° C. under reduced pressure to obtain the aqueous dispersion of polyurethane resin, which contains 14 percent concentration by mass of polyurethane resin as the nonvolatile content and 21 percent concentration by mass of phosphorous compound (1) as the nonvolatile content.

A resin processed cloth was obtained in the same way as Example 1, using the aqueous dispersion of polyurethane resin obtained.

Comparative Example 1

In the same manner as Example 1, except that 15.0 g of the phosphorous compound (1) was not used, the aqueous dispersion of polyurethane resin which contains a nonvolatile content corresponding to 30 percent concentration by mass.

A resin processed cloth was obtained in the same way as Example 1, using the aqueous dispersion of polyurethane resin obtained.

<Evaluation of Flame Retardancy>

The flame retardancies of the resin processed cloths obtained in Examples from 1 to 12 and Comparative example 1 were measured according to the A-1 method (45 degree microburner method). In this regard, the flame retardancy of the resin processed cloth having the afterflame time within 3 seconds was regarded as acceptable.

The results were shown in Table 1.

TABLE 1

| | Flame retardancy (*1) | |
|---|---|---|
| | Afterflame time by 45 degree micro burner method (seconds) | Pass or Fail |
| Example 1 | 0 | Pass |
| Example 2 | 0 | Pass |
| Example 3 | 0 | Pass |
| Example 4 | 0 | Pass |
| Example 5 | 0 | Pass |
| Example 6 | 0 | Pass |
| Example 7 | 0 | Pass |
| Example 8 | 0 | Pass |
| Example 9 | 0 | Pass |
| Example 10 | 0 | Pass |
| Example 11 | 0 | Pass |
| Example 12 | 0 | Pass |
| Comparative example 1 | Completely burned down | Fail |

(*1): Flame retardancy was indicated by the averaged value of 6 performances.

As is clear from the results of said Table 1, it was confirmed that the resin processed cloths processed by the process liquid which contains the aqueous dispersion of polyurethane resin of the present invention (Examples from 1 to 12) had sufficient flame retardancies.

INDUSTRIAL APPLICABILITY

The aqueous dispersion of polyurethane resin of the present invention can provide a sufficient flame retardancy even though much smaller amounts of phosphorous compound than usual are used and also can sufficiently prevent the deterioration of dyeing fastness. Therefore, it is possible to provide fiber products such as a car seat, a roll screen and a filtering medium. Thus, the aqueous dispersion of polyurethane resin of the present invention is extremely useful for industry.

The invention claimed is:
1. An aqueous dispersion of polyurethane resin obtained by
a chain elongation reaction in water, by adding (C) at least one chain extender selected from a group consisting of water-soluble polyamines, hydrazine and derivatives thereof to a dispersion liquid obtained by emulsifying and dispersing a mixture in water,
said mixture comprising (B) at least one compound selected from the phosphorous compounds represented by the following formula (1) and (A) an urethane prepolymer and/or a neutralized urethane prepolymer material which has an isocyanate group at the terminal,
wherein said urethane prepolymer of said component (A) is an urethane prepolymer obtained by reacting (a1) an organic polyisocyanate and (a2) a polymeric polyol, and said neutralized urethane prepolymer material is a neutralized material obtained by neutralizing an urethane prepolymer which is obtained by further using (a3) compound having an anionic hydrophilic group and at least two active hydrogens in a molecule together with said components (a1) and (a2)

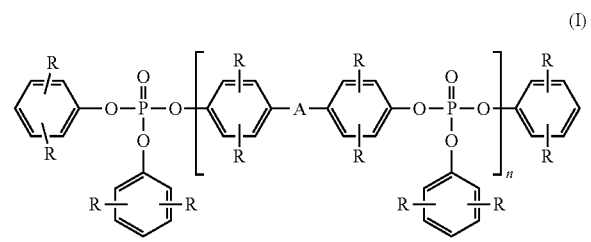

wherein, n is a number from 2.6 to 10, A is a single bond, —C(CH$_3$)$_2$—, —SO$_2$-, —S— or —O—, R is each, independently a hydrogen atom, an alkyl group or a phenyl group,
wherein said polymeric polyol (a2) is selected from the group consisting of polycarbonate polyols, polyether polyols and dimerdiols, and
wherein said polyether polyols are obtained by:
(a) polymerizing one or more polyols selected from ethylene glycol, diethylene glycol, triethylene glycol, propylene glycol, trimethylene glycol, 1,3-butanediol, 1,4-butanediol, 1,5-pentanediol, 1,6-hexanediol, neopentyl glycol, glycerin, trimethylol ethane, trimethylol propane, sorbitol, sucrose, bisphenol A, bisphenol S and hydrogenated bisphenol A, or (b) addition polymerization reaction of compound having at least two active hydrogens and one or more monomers selected from ethylene oxide, propylene oxide, butylene oxide, styrene oxide, epichlorohydrin, tetrahydrofuran and cyclohexylene oxide.

2. The aqueous dispersion of polyurethane resin according to claim 1, wherein the organic polyisocyanate of said component (a1) is an aliphatic diisocyanate or an alicyclic diisocyanate.

3. The aqueous dispersion of polyurethane resin according to claim 1, wherein the polymeric polyol of said component (a2) is a polyol having 500 to 4000 of average molecular weight.

4. The aqueous dispersion of polyurethane resin according to claim 1, wherein said component (A) is an urethane prepolymer and/or a neutralized urethane prepolymer material obtained by further adding a polyalcohol as a component (a4) together with said components from (a1) to (a3).

5. The aqueous dispersion of polyurethane resin according to claim 1, wherein the content of phosphorous compound of said component (B) is 1 to 15 parts by mass relative to 100 parts by mass of polyurethane resin in said aqueous dispersion of polyurethane resin.

6. The aqueous dispersion of polyurethane resin according to claim 1, wherein said component (A) is a neutralized urethane prepolymer material and the anionic hydrophilic group of the compound (a3), which is one of the elements constituting said neutralizing material, is a carboxyl group.

7. A flame retardant polyester fiber obtained by providing the process liquid containing the aqueous dispersion of polyurethane resin according to claim 1 to the polyester fiber and then drying.

8. The flame retardant polyester fiber according to claim 7, wherein the provided amount of the phosphorous compound (B) is 0.1 to 2 parts by mass relative to 100 parts by mass of said polyester fiber.

9. A method for manufacturing the flame-retardant polyester fiber comprising a step of providing the process liquid containing the aqueous dispersion of polyurethane resin according to claim 1 to the surface of polyester fiber so that the provided amount of the phosphorous compound (B) is 0.1 to 2 parts by mass relative to 100 parts by mass of said polyester fiber, and a step of drying it.

10. The aqueous dispersion of polyurethane resin according to claim 1, wherein said polymeric polyol (a2) is a polycarbonate polyol.

11. The aqueous dispersion of polyurethane resin according to claim 10, wherein polycarbonate polyol is polyhexamethylene carbonatediol or 3-methyl-1,5-pentanediol carbonatediol.

12. The aqueous dispersion of polyurethane resin according to claim 1, wherein the (a1) organic polyisocyanate is isophorone diisocyanate or dicyclohexylmethane diisocyanate.

13. The aqueous dispersion of polyurethane resin according to claim 1, wherein said phosphorous compound of component (B) is one or more compounds selected from the following phosphorous compounds from (1) to (4):

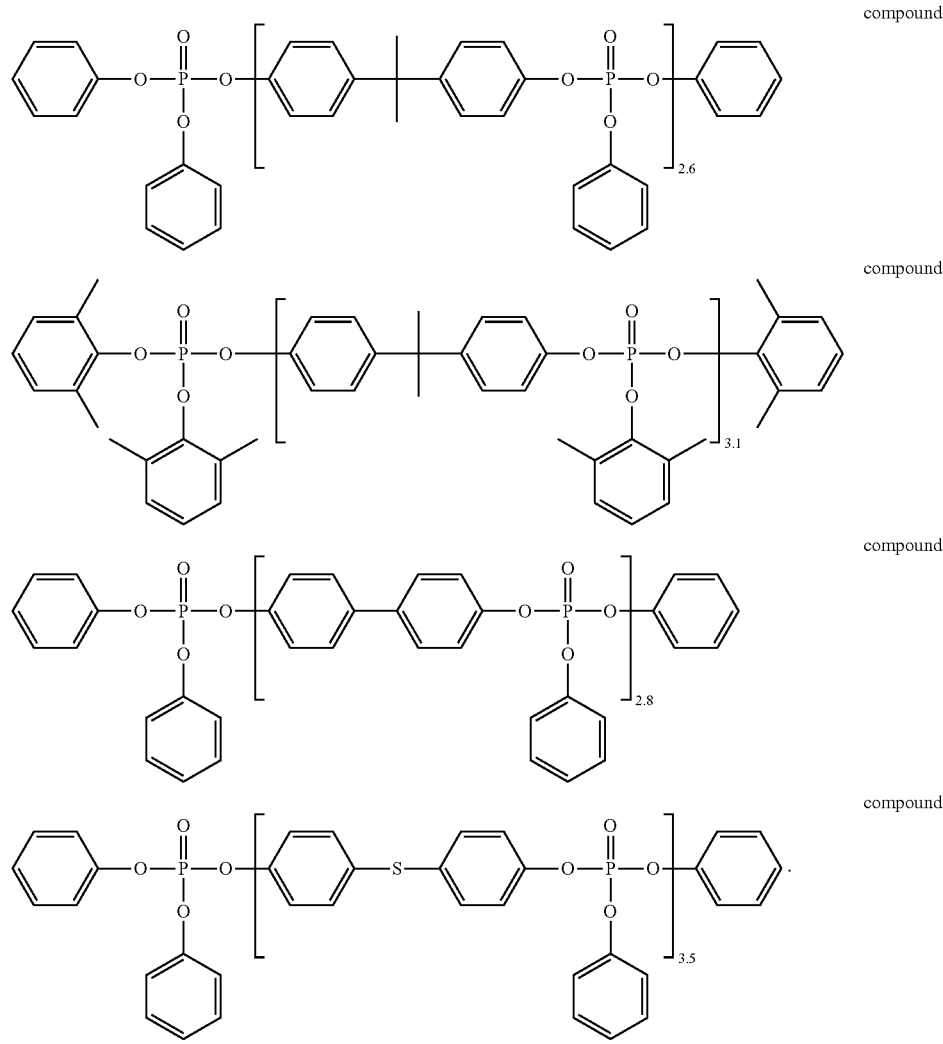

compound (1)

compound (2)

compound (3)

compound (4)

14. The aqueous dispersion of polyurethane resin according to claim 1, wherein the content of phosphorous compound of component (B) is 1 to 30 parts by mass relative to 100 parts by mass of polyurethane resin in said aqueous dispersion of polyurethane resin.

15. The aqueous dispersion of polyurethane resin according to claim 1, wherein the content of phosphorous compound of component (B) is 3 to 15 parts by mass relative to 100 parts by mass of polyurethane resin in said aqueous dispersion of polyurethane resin.

16. The aqueous dispersion of polyurethane resin according to claim 1, wherein the chain extender of component (C) is ethylene diamine, propylene diamine, tetramethylene diamine, hexamethylene diamine, diaminocyclohexyl methane, hydrazine, piperazine, 2-methylpiperazine, tolylenediamine, xylylene diamine, isophorone diamine, norbornane diamine, diethylene triamine, triethylene tetramine.

17. The aqueous dispersion of polyurethane resin according to claim 1, wherein the chain extender of component (C) is 1,1'-ethylene dihydrazine, 1,1'-trimethylene dihydrazine, 1,1'-(1,4-butylene)dihydrazine, oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide or itaconic acid dihydrazide.

* * * * *